US012533989B1

United States Patent
Yoneyama et al.

(10) Patent No.: US 12,533,989 B1
(45) Date of Patent: Jan. 27, 2026

(54) ECU POWER SUPPLY VOLTAGE MONITORING DEVICE AND METHOD

(71) Applicant: HONDA MOTOR CO., LTD., Tokyo (JP)

(72) Inventors: Hiroyuki Yoneyama, Dublin, OH (US); Yasushi Hori, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 18/785,202

(22) Filed: Jul. 26, 2024

(51) Int. Cl.
*B60L 58/13* (2019.01)
*B60L 58/16* (2019.01)

(52) U.S. Cl.
CPC .............. *B60L 58/13* (2019.02); *B60L 58/16* (2019.02); *B60L 2210/10* (2013.01); *B60L 2240/12* (2013.01); *B60L 2240/80* (2013.01)

(58) Field of Classification Search
CPC ...... B60L 58/13; B60L 58/16; B60L 2210/10; B60L 2240/12; B60L 2240/80
See application file for complete search history.

(56) References Cited

U.S. PATENT DOCUMENTS

| | | | |
|---|---|---|---|
| 5,481,730 A * | 1/1996 | Brown | G06F 1/26 713/340 |
| 5,850,514 A | 12/1998 | Gonda et al. | |
| 7,906,948 B2 * | 3/2011 | Qiu | H02M 3/1588 323/283 |
| 8,024,625 B2 | 9/2011 | Noguchi | |
| 8,441,239 B2 * | 5/2013 | Miyamae | H02M 3/156 323/282 |
| 8,766,609 B2 * | 7/2014 | Babasaki | H05B 39/047 323/275 |
| 9,279,744 B2 | 3/2016 | Yasue | |
| 9,494,623 B2 * | 11/2016 | McNulty | G01R 19/155 |
| 9,843,195 B2 * | 12/2017 | Itaya | H02J 13/00034 |
| 11,190,957 B2 | 11/2021 | Kim | |
| 2024/0407053 A1 * | 12/2024 | Trussler | H05B 1/0244 |

FOREIGN PATENT DOCUMENTS

| | | |
|---|---|---|
| CN | 117707111 A | 3/2024 |
| DE | 10 2004 023 084 B3 | 6/2005 |
| DE | 10 2013 101 998 A1 | 10/2013 |
| DE | 10 2017 219 388 B4 | 11/2022 |
| JP | 2009-61987 A | 3/2009 |
| JP | 2010-95134 A | 4/2010 |
| JP | 5764043 B2 | 8/2015 |
| JP | 2021-160397 A | 10/2021 |
| KR | 10-1392834 B1 | 5/2014 |
| KR | 10-1548923 B1 | 9/2015 |

* cited by examiner

*Primary Examiner* — Gertrude Arthur Jeanglaude
(74) *Attorney, Agent, or Firm* — WHDA, LLP (57) ABSTRACT

A method of monitoring a power supply voltage to an electronic control unit equipped with a vehicle by using a voltage monitoring device, comprising: detecting the power supply voltage to the electronic control unit; comparing the detected power supply voltage with a predetermined threshold value; accumulating an anomaly length of time during which the detected power supply voltage is lower than the predetermined threshold value; determining whether the accumulated anomaly length of time becomes a predetermined anomaly threshold time or more; and when it is determined that the accumulated anomaly length of time becomes the predetermined anomaly threshold time or more, determining that the anomaly occurs on the voltage monitoring device.

20 Claims, 12 Drawing Sheets

| ECU ID | ANOMALY CODE |
|---|---|
| XXXXXXX | 1 |
| ................ | ................ |

ECU POWER SUPPLY VOLTAGE MONITORING DEVICE AND METHOD

BACKGROUND

Technical Field

The present disclosure relates to an Electronic Control Unit (ECU) power supply voltage monitoring device and method.

Related Art

A plurality of electronic devices are mounted on a vehicle to perform various processes. A plurality of ECUs (Electronic Control Units) are mounted on a vehicle in order to control operations of the electronic devices to perform various functions. The ECUs receive electrical power from a power supply system.

SUMMARY

In one aspect of the present disclosure, a voltage monitoring device monitoring a power supply voltage to an electronic control unit equipped with a vehicle comprising:
- a detector detecting the power supply voltage to the electronic control unit; and
- a monitoring processor performing an anomaly monitoring on the power supply voltage to the electronic control unit, the anomaly monitoring determining whether anomaly occurs on the voltage monitoring device, wherein, as the anomaly monitoring, the monitoring processor:
compares the detected power supply voltage with a predetermined threshold value,
accumulates an anomaly length of time during which the detected power supply voltage is lower than the predetermined threshold value,
determines whether the accumulated anomaly length of time becomes a predetermined anomaly threshold time or more, and when it is determined that the accumulated anomaly length of time becomes the predetermined anomaly threshold time or more, determines that the anomaly occurs on the voltage monitoring device.

BRIEF DESCRIPTION OF THE DRAWINGS

The advantages of the disclosure will become apparent in the following description taken in conjunction with the following drawings.

DESCRIPTION OF EXEMPLARY EMBODIMENTS

Hereinafter, the present disclosure will be described through embodiments, but the following embodiments do not limit the invention according to the claims. In addition, not all combinations of features described in the embodiments are essential to the solution of the invention.

Figure 1:
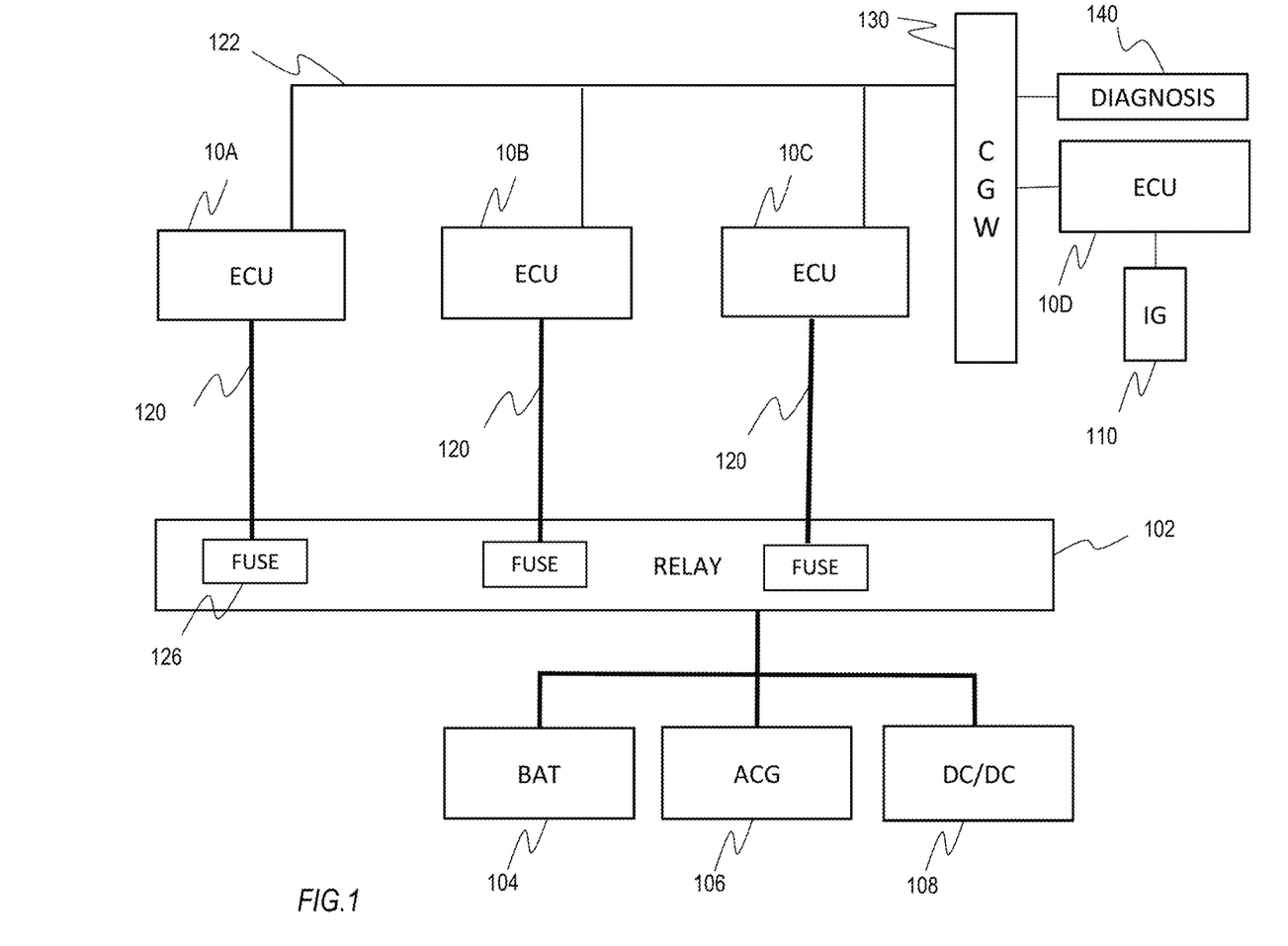
FIG. 1 schematically describes a power supply system of a vehicle to which a power supply voltage monitoring device of the present application is applied.

FIG. 1 schematically describes a power supply system of a vehicle to which a power supply voltage monitoring device of the present application is applied. For example, the vehicle may be a vehicle with an internal combustion engine, an electric vehicle such as a Battery Electric Vehicle (BEV), a Hybrid Electric Vehicle (HEV), a Plug-in Hybrid Electric Vehicle (PHEV), an Extended Range Electric Vehicle (EREV).

A plurality of Electronic Control Units (ECUs) 10 are equipped with the vehicle to provide various functions implemented by executing a software program. For example, the ECU provides control of the internal combustion engine, control of an electric motor, and control of a transmission (automatic transmission or semi-automatic transmission). For example, a vehicle ECU which controls a transmission is called as a transmission control unit (TCU). As shown by FIG. 1, the ECUs 10A, 10B and 10C are connected to respective power supply lines (power supply wirings) 120 to receive power supply. The power supply lines 120 are each connected to a power supply source through a relay 102.

The relay 102 includes a plurality of fuses inside thereof. The plurality of power lines 120 are connected to the fuses respectively to receive power from the power source. For example, in this configuration, possible problem which occurs on the upstream side of the fuses may be a possible problem occurring in the power supply system itself on the upstream side of ECUs. The power source may include a low-voltage (12V) battery 104, a vehicle alternator 106 and a DC/DC converter 108.

Depending on the type of the vehicle, one or more of the power sources may be connected to the power supply line 120. For example, when the vehicle is a vehicle with an internal combustion engine, the low-voltage (12V) battery 104 and the vehicle alternator 106 may be connected to the power supply line 120 as a power source. When the vehicle is a Battery Electric Vehicle (BEV), the low-voltage (12V) battery 104 and the DC/DC converter 108 may be connected to the power supply line 120 as a power source. The DC/DC converter 108 down-converts electrical power from a high-voltage battery such as a lithium-ion battery which functions as a power supply for driving an electric motor of the vehicle. When the vehicle is a Hybrid Electric Vehicle (HEV), the low-voltage (12V) battery 104, the vehicle alternator 106 and the DC/DC converter 108 may be connected to the power supply line 120 as a power source.

The ECUs 10A, 10B and 10C are also connected to an in-vehicle communication 122 such as Control Area Network (CAN), Ethernet® and Local Interconnect Network (LIN). The ECUs 10A, 10B and 10C may communicate with one another and communicate with other devices through the in-vehicle communication such as CAN bus 122 by sending and receiving information, data and signals. For example, the ECUs 10A, 10B and 10C may receive a signal related to state of an ignition 110 which indicates that the ignition 110 is turned on or the ignition 110 is turned off. For example, as described by FIG. 1, ECU 10D such as Body Control Module (BCM) controls and manages the ignition 110 and sends the signal related to the state of the ignition 110. The ECUs 10A, 10B and 10C may receive the signal from the ECU 10D via the in-vehicle communication 122 through a gateway 130 such as Central Gateway (CGW). As shown by FIG. 1, a diagnosis device 140 may be connected to the CGW 130 to obtain information and data stored in the ECUs to perform diagnosis of the ECUs.

Figure 2:
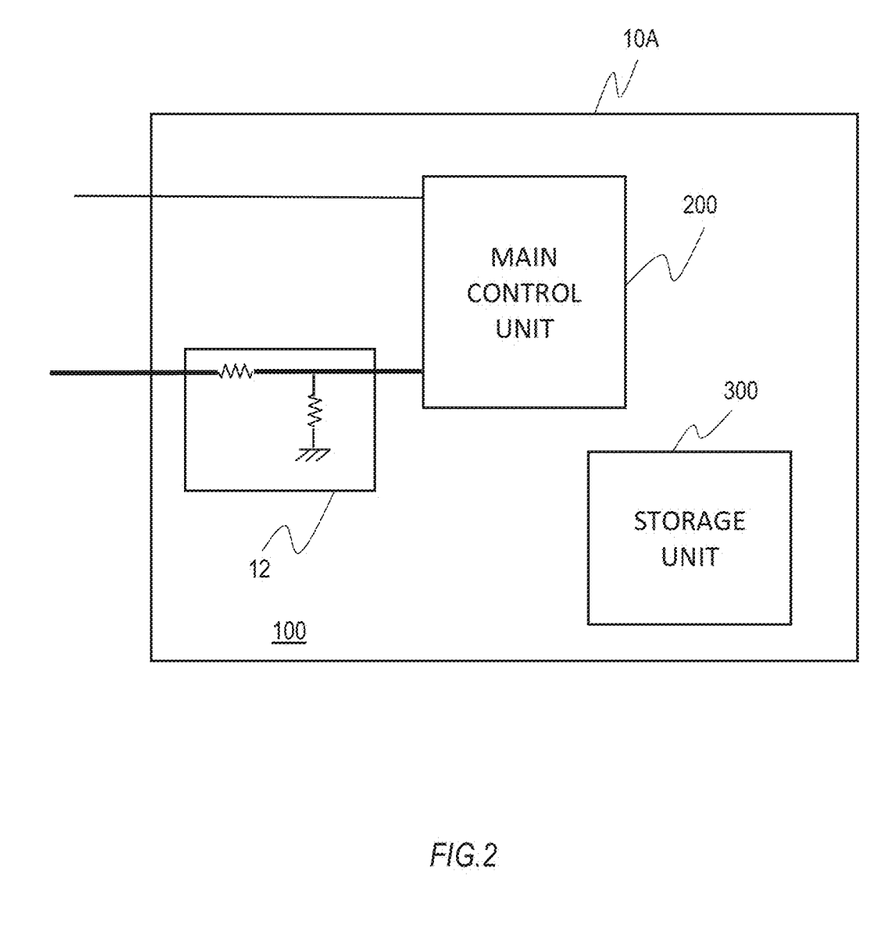
FIG. 2 schematically describes a power supply voltage monitoring device according to one embodiment.

FIG. 2 schematically describes a power supply voltage monitoring device 100 according to one embodiment. Here, description is provided by using ECU 10A as an example. The other ECU such as ECU 10B may have the same configuration. For example, the ECU 10A includes a main control unit 200, a storage unit 300 and a power supply voltage detector 12. The main control unit 200 includes a processor such as a CPU and the storage unit 300 includes a memory device such as a semiconductor memory. The power supply voltage detector 12 detects the power supply voltage inside the ECU 10A and provides the detected power supply voltage inside the ECU 10A to the main control unit 200.

Figure 3:
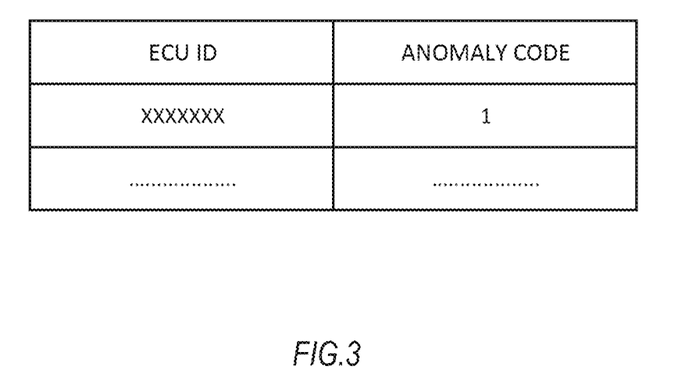
FIG. 3 is an example of a table which shows data structure stored in the ECU.

There are regulations related to On-Board Diagnostics (OBD) that require that faults in the ECU's power supply voltage monitoring system be detected. For example, when the detected power supply voltage inside the ECU 10A becomes lower than a predetermined threshold, it is required to determine whether a fault occurs in the ECU's power supply voltage monitoring system. Also, when it is determined that a fault occurs in the ECU's power supply voltage monitoring system, it is required to record anomaly code of the event of fault to the storage unit 300. FIG. 3 is an example of a table which shows data structure of the record of the anomaly code stored in the storage unit 300. However, according to the study of the inventors, there is a possibility of pseudo faults caused by temporally adherence of a foreign object to the power supply line inside the ECU or temporally electrical contact issue on electrical devices inside the ECU. Therefore, it is preferable to improve accuracy in determination of a fault occurred in the ECU's power supply voltage monitoring system.

Figure 4:
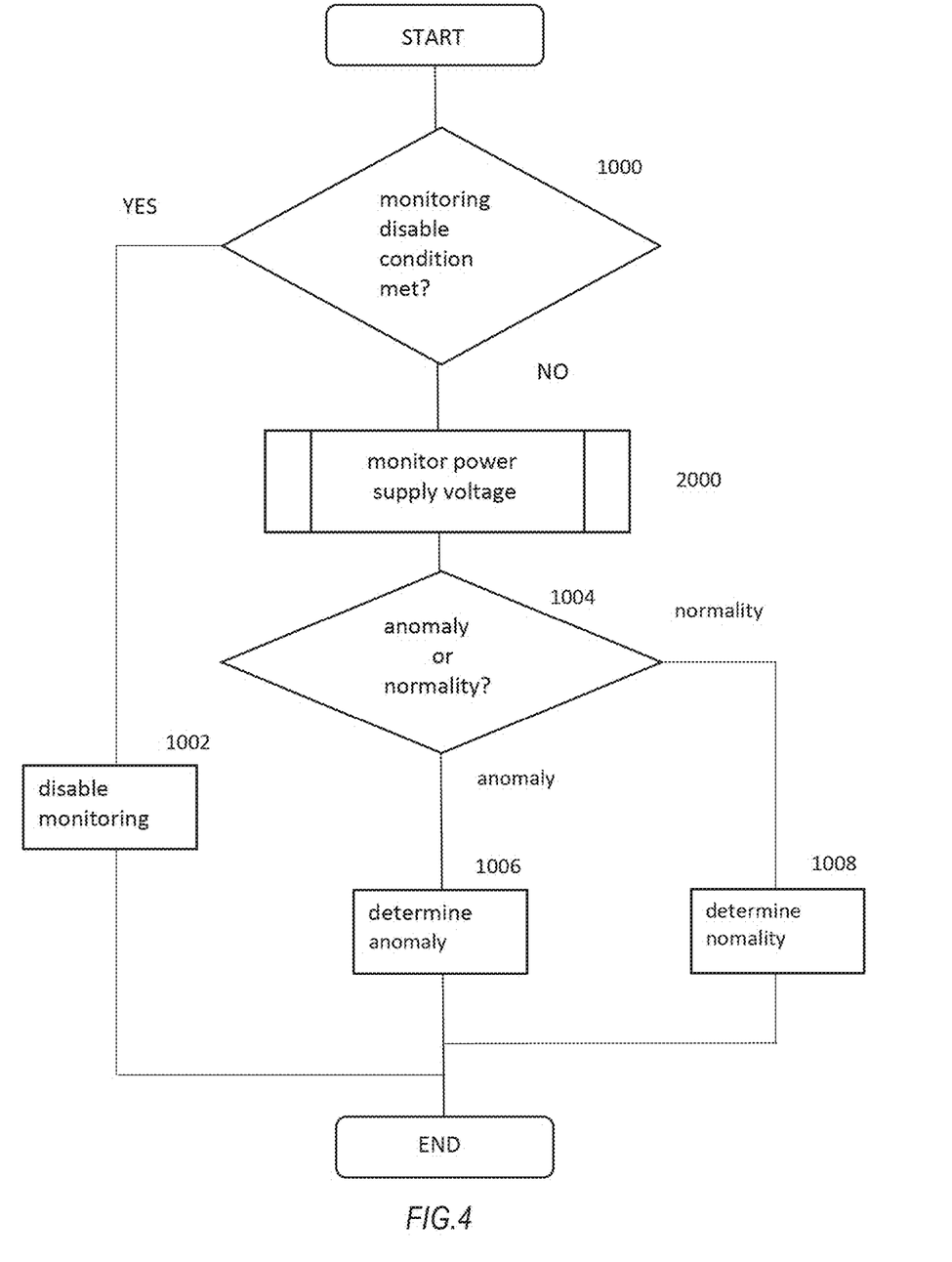
FIG. 4 shows a processing of a power supply voltage monitoring method according to one embodiment of the present application.

FIG. 4 shows a general flow of a processing of a power supply voltage monitoring method according to one embodiment of the present application. At step 1000, it is determined whether power supply voltage monitoring disable condition is met or not. When the answer is affirmative, the power supply voltage monitoring is disabled at step 1002. On the other hand, when the answer is negative at step 1000, the process proceeds to step 2000 and the process of monitoring the power supply voltage is performed. As a result, at step 1004, it is determined whether anomaly occurs in the power supply voltage monitoring device. When the answer is affirmative, the process proceeds to step 1006, anomaly is found, and the fault event is recorded in the storage unit. On the other hand, when the answer is negative at step 1004, normality is found at step 1008.

Figure 5:
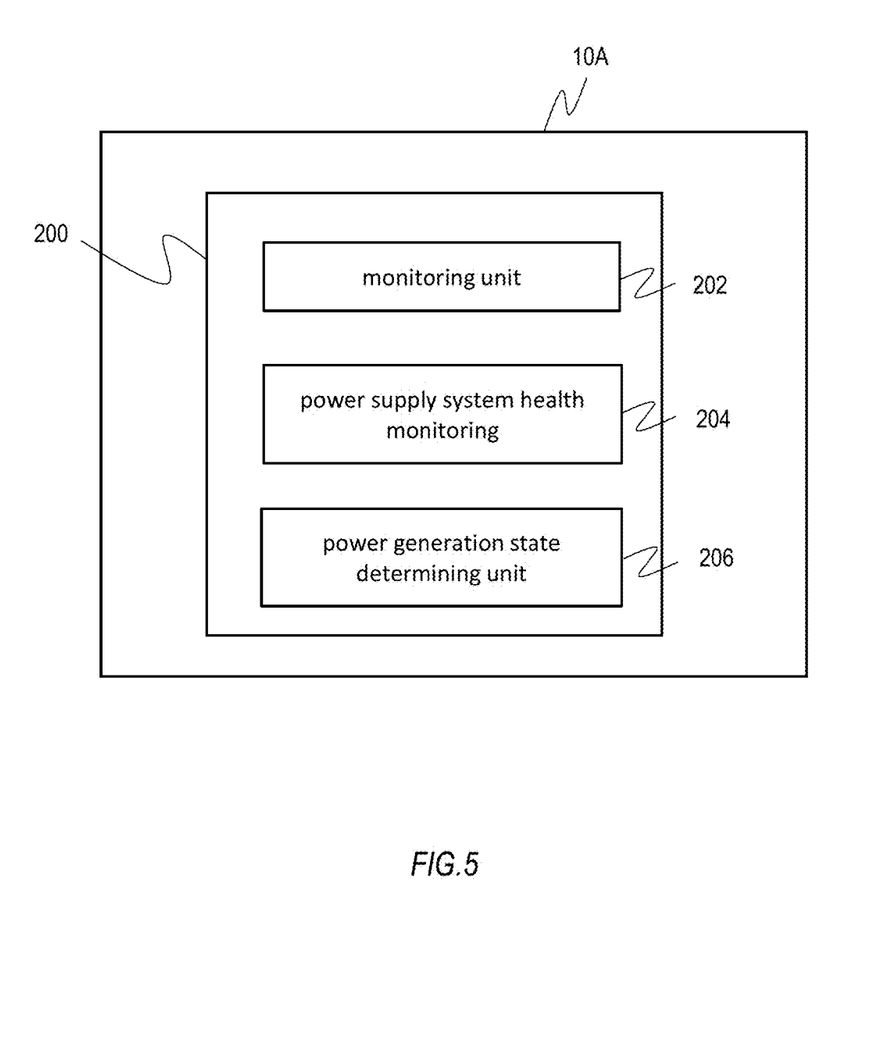
FIG. 5 schematically describes functions embodied by a control unit according to one embodiment.

FIG. 5 schematically describes a functional configuration embodied by a main control unit according to one embodiment. The power supply voltage monitoring device 100 includes, as functional configurations, a monitoring unit 202, a power supply system health monitoring unit 204 and a power generation state determining unit 206. These functional configurations are realized, for example, by reading a predetermined computer program stored in a storage medium into a RAM and executing signal processing by a CPU of the main control unit 200. The functional configurations may be configured by an integrated circuit or the like as long as they perform similar functions.

The monitoring unit 202 performs an anomaly monitoring on the power supply voltage detected by the detector 12. The anomaly monitoring determines whether anomaly occurs on the power supply voltage monitoring device. The monitoring unit 202 compares the detected power supply voltage with a predetermined threshold value, and accumulates an anomaly length of time during which the detected power supply voltage is lower than the predetermined threshold value. The monitoring unit 202 determines whether the accumulated anomaly length of time becomes a predetermined anomaly threshold time or more, and when it is determined that the accumulated anomaly length of time becomes the predetermined anomaly threshold time or more, determines that the anomaly occurs on the voltage monitoring device.

The monitoring unit 202 also accumulates a normality length of time during which the detected power supply voltage is equal to or more than the predetermined threshold value, and determines whether the accumulated normality length of time becomes a predetermined normality threshold time or more. When it is determined that the accumulated normality length of time becomes the predetermined normality threshold time or more, the monitoring unit 202 reduces the accumulated anomaly length of time. Alternatively, the monitoring unit 202 may reset the accumulated anomaly length of time to zero.

Here, the predetermined anomaly threshold value may be constant value or may be varied according to a power generation state in a power supply system. For example, due to aging of the vehicle alternator, the voltage supplied by the alternator may become lower than a normal power generation state. In such a situation, it is preferable to change the predetermined anomaly threshold value to a lower value to improve accuracy of detection of fault in the power supply voltage monitoring device.

The power supply system health monitoring unit 204 determines that possible problem occurs in the power supply system itself for example, on the upstream side of ECUs. The power supply system health monitoring unit 204 detects that the detected power supply voltage to ECU 10A falls below a predetermined first voltage, and determines whether the detected power supply voltage to ECU 10B falls below a predetermined second voltage before the accumulated anomaly length of time becomes the predetermined anomaly threshold time or more in the ECU 10A. Such a determination may be performed by communication between ECU 10A and ECU 10B through CAN bus 122.

When it is determined that the possible problem occurs in the power supply system, the power supply system health monitoring unit 204 disables the anomaly monitoring by the monitoring unit 202. The anomaly monitoring by ECU 10A may be disabled. Also, the anomaly monitoring by other ECU such as ECU 10B may be also disabled.

When it is determined that the possible problem occurs in the power supply system, the power supply system health monitoring unit 204 may reduce the accumulated anomaly length of time in ECU 10A or ECU 10B or both. Alternatively, the power supply system health monitoring unit 204 may reset the accumulated anomaly length of time to zero.

The power generation state determining unit 206 determines whether a power generation state in a power supply system satisfies a predetermined state. The predetermined power generation state includes, for example, an idling stop state of an internal combustion engine, a DC-DC converter circuit stop state in the power supply system (EV or HEV), an in-vehicle communication such as CAN activating state after an ignition switch is turned on, or a low engine speed state in which a speed of the internal combustion engine is lower than a predetermined speed.

During the idling stop state of the internal combustion engine, or the DC-DC converter circuit stop state in EV or HEV, the power supply voltage becomes unstable. For example, within three seconds after the ignition switch is turned on, the in-vehicle communication such as CAN is still under activation and has not been established. When the speed of the internal combustion engine is lower than a predetermined speed, the power supply voltage becomes unstable. The predetermined speed of the internal combustion engine may be decided by experimentation for each model of a vehicle. When the power generation state in the power supply system satisfies these kinds of predetermined state, it may cause false detection or false record of the fault occurred in the power supply system in the ECU itself.

Thus, when it is determined that the power generation state in the power supply system satisfies the predetermined state, the power generation state determining unit 206 temporarily disables the anomaly monitoring by the monitoring unit 202.

Then, when it is determined that the power generation state in the power supply system no longer satisfies the predetermined state, the power generation state determining unit 206 enables the anomaly monitoring by the monitoring unit 202. The power generation state determining unit 206 may maintain the accumulated anomaly length of time during time when the anomaly monitoring by the monitoring unit 202 is temporarily disabled.

First Embodiment

Figure 6:
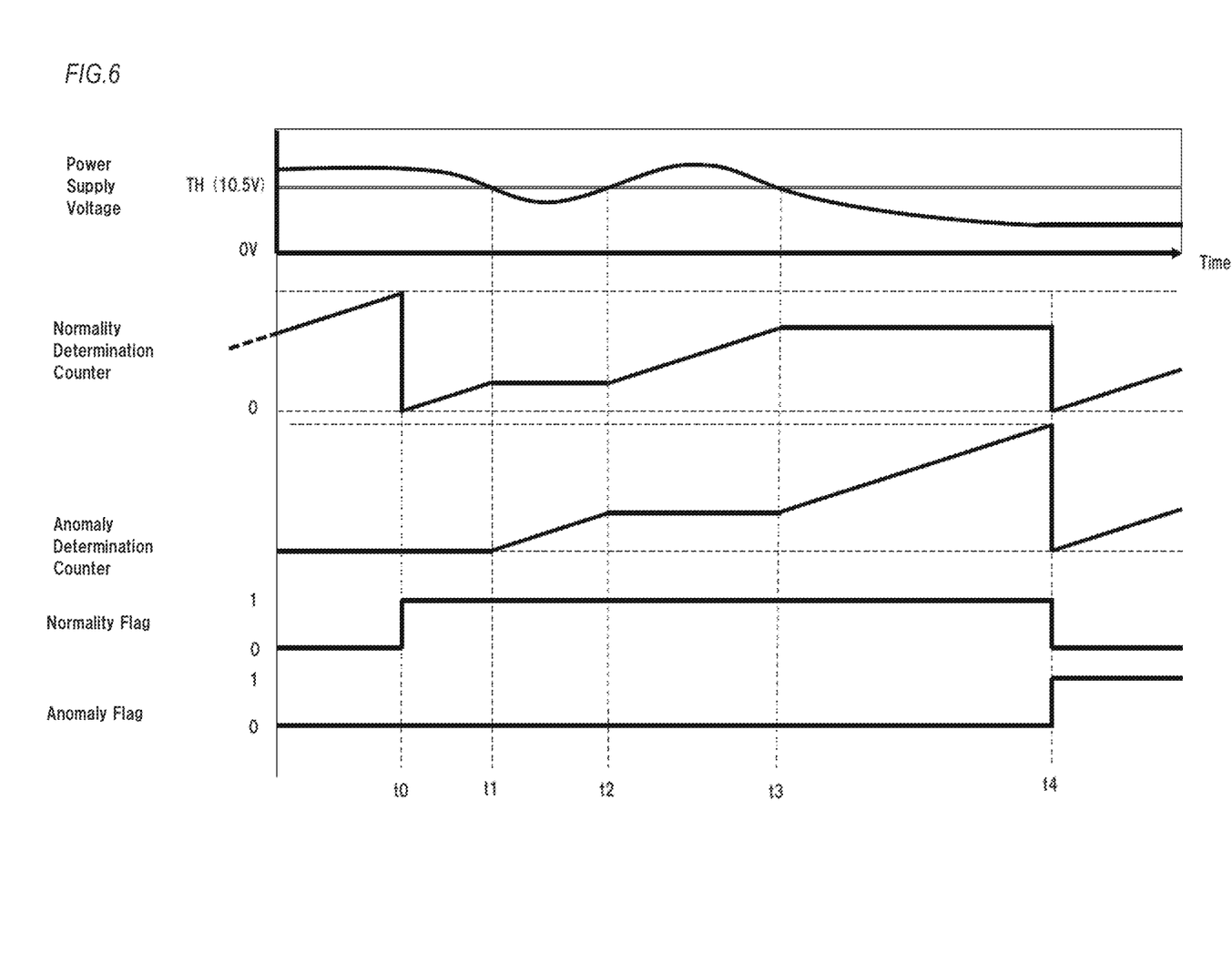
FIG. 6 schematically shows a timing chart of a first embodiment of the present application.

FIG. 6 schematically shows a timing chart of a first embodiment of the present application. As shown by FIG. 6, at the time t0, it is assumed that the power supply voltage has been maintained equal to or higher than the threshold voltage TH. Thus, a normality determination counter has reached the predetermined normality threshold time. A normality flag is set to 1. Also, the normality determination counter has been reduced to zero (reset). At the time t1, the power supply voltage drops lower than the threshold voltage TH. Then, an anomaly determination counter starts accumulating an anomaly length of time during which the detected power supply voltage is lower than the threshold value TH.

At the time t2, the power supply voltage increases to a value equal to or higher than the threshold voltage TH. Then, the anomaly determination counter stops or pauses the accumulation of the anomaly length of time. Also, the anomaly determination counter holds the accumulated anomaly length of time.

At the time t3, the power supply voltage again drops lower than the threshold voltage TH. Then, the anomaly determination counter re-starts accumulating the anomaly length of time during which the detected power supply voltage is lower than the threshold value TH.

At the time t4, the anomaly determination counter has reached the predetermined anomaly threshold time. An anomaly flag is set to 1. Also, the anomaly determination counter is reduced to zero (reset).

On the other hand, at the time t0, the power supply voltage stays equal to or higher than the threshold voltage TH. Then, the normality determination counter starts accumulating the normality length of time during which the detected power supply voltage is equal to or more than the predetermined threshold value TH.

At the time t1, the power supply voltage drops lower than the threshold voltage TH. Then, the normality determination counter stops or pauses the accumulation of the normality length of time. Also, the normality determination counter holds the accumulated normality length of time.

At the time t2, the power supply voltage increases to a value equal to or higher than the threshold voltage TH. Then, the normality determination counter re-starts accumulating the normality length of time.

At the time t3, the power supply voltage again drops lower than the threshold voltage TH. Then, the normality determination counter stops or pauses the accumulation of the normality length of time. Also, the normality determination counter holds the accumulated normality length of time.

At the time t4, the anomaly determination counter has reached the predetermined anomaly threshold time. The normality flag is set to 0. Also, the normality determination counter is reduced to zero (reset).

Figure 7:
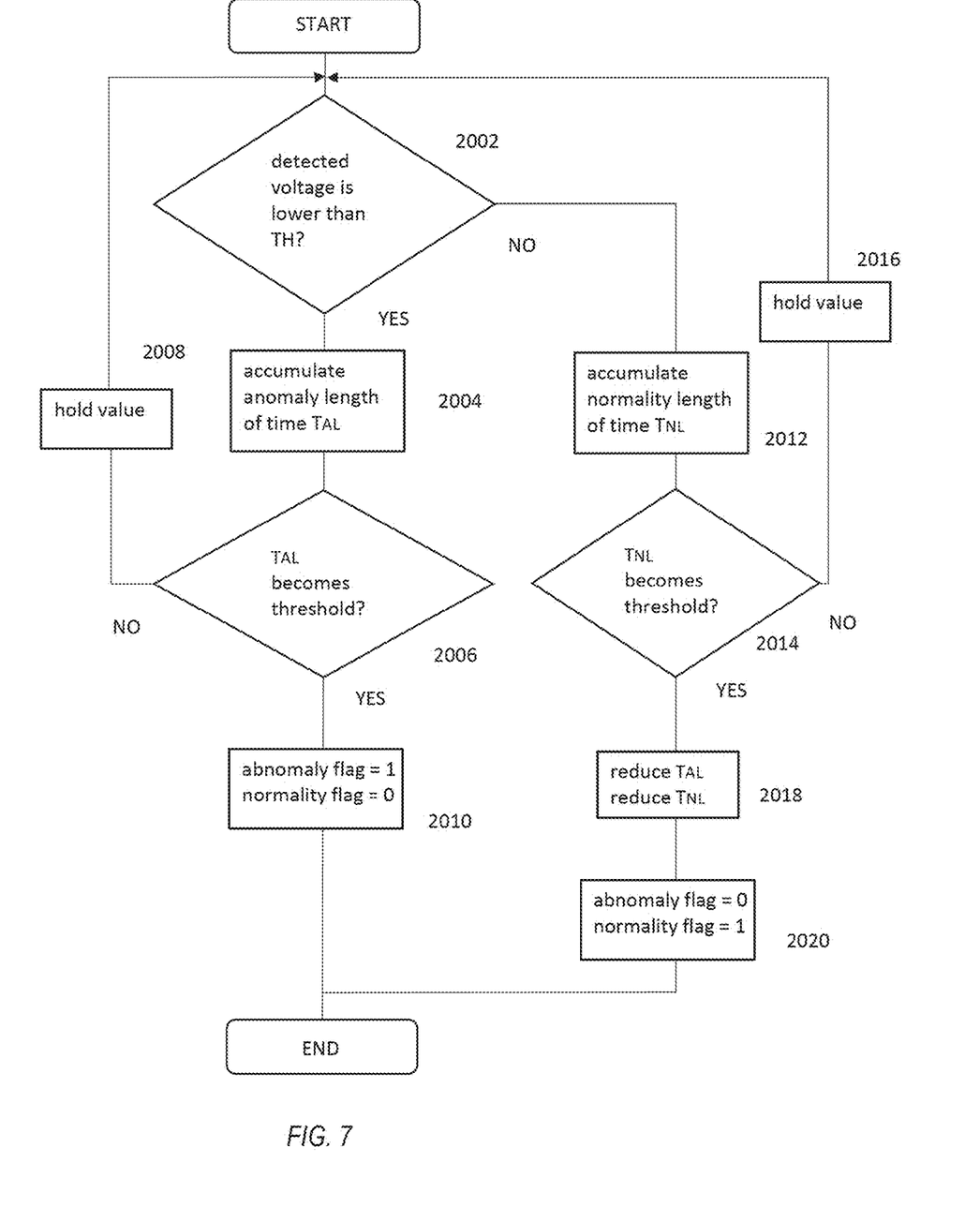
FIG. 7 shows a processing of a power supply voltage monitoring method according to the first embodiment of the present application.

FIG. 7 shows a processing of a power supply voltage monitoring method according to the first embodiment of the present application. The processing described by FIG. 7 is performed by the monitoring unit 202.

At step 2002, it is determined whether the detected power supply voltage is lower than the predetermined threshold value TH. When the answer is affirmative, the process proceeds to the step 2004. At step 2004, the monitoring unit 202 accumulates an anomaly length of time $T_{AL}$ during which the detected power supply voltage is lower than the predetermined threshold value to, for example, the anomaly determination counter. Then, at step 2006, it is determined whether the accumulated anomaly length of time $T_{AL}$ becomes a predetermined anomaly threshold time or more. When the answer is affirmative, the monitoring unit 202 determines that anomaly occurs on the voltage monitoring device and the process proceeds to step 2010. At step 2010, the anomaly flag is set to one and the normality flag is set to zero. When the answer is negative at step 2006, the anomaly determination counter holds the value at step 2008 and the process goes to loop back to step 2002.

On the other hand, when the answer is negative at step 2002, the process moves to step 2012 and the monitoring unit 202 accumulates a normality length of time $T_{NL}$ during which during which the detected power supply voltage is equal to or more than the predetermined threshold value to, for example, the normality determination counter.

Then, at step 2014, it is determined whether the accumulated normality length of time $T_{NL}$ becomes a predetermined normality threshold time or more. When the answer is affirmative, the monitoring unit 202 reduces the accumulated anomaly length of time $T_{AL}$ at step 2018. Also, the accumulated normality length of time $T_{NL}$ may be also reduced or reset to zero. Then, at step 2020, the anomaly flag is set to zero and the normality flag is set to one.

When the answer is negative at step 2014, the normality determination counter holds the value at step 2016 and the process goes to loop back to step 2002.

In the present embodiment, the monitoring unit 202 may accumulate the anomaly length of time $T_{AL}$ during which the detected power supply voltage is lower than the predetermined threshold value. Also, the monitoring unit 202 may determine that anomaly occurs on the voltage monitoring device when the accumulated anomaly length of time $T_{AL}$ becomes a predetermined anomaly threshold time or more. Thus, the monitoring unit 202 may avoid substantial influence to the anomaly determination by pseudo faults caused by temporally decrease in the power supply voltage which is caused by various factors such as temporally electrical contact issue on electrical devices inside the ECU.

Thus, it is possible to improve accurate determination of anomaly or fault occurrence in the power supply voltage monitoring device for the ECU.

Second Embodiment

Figure 8:
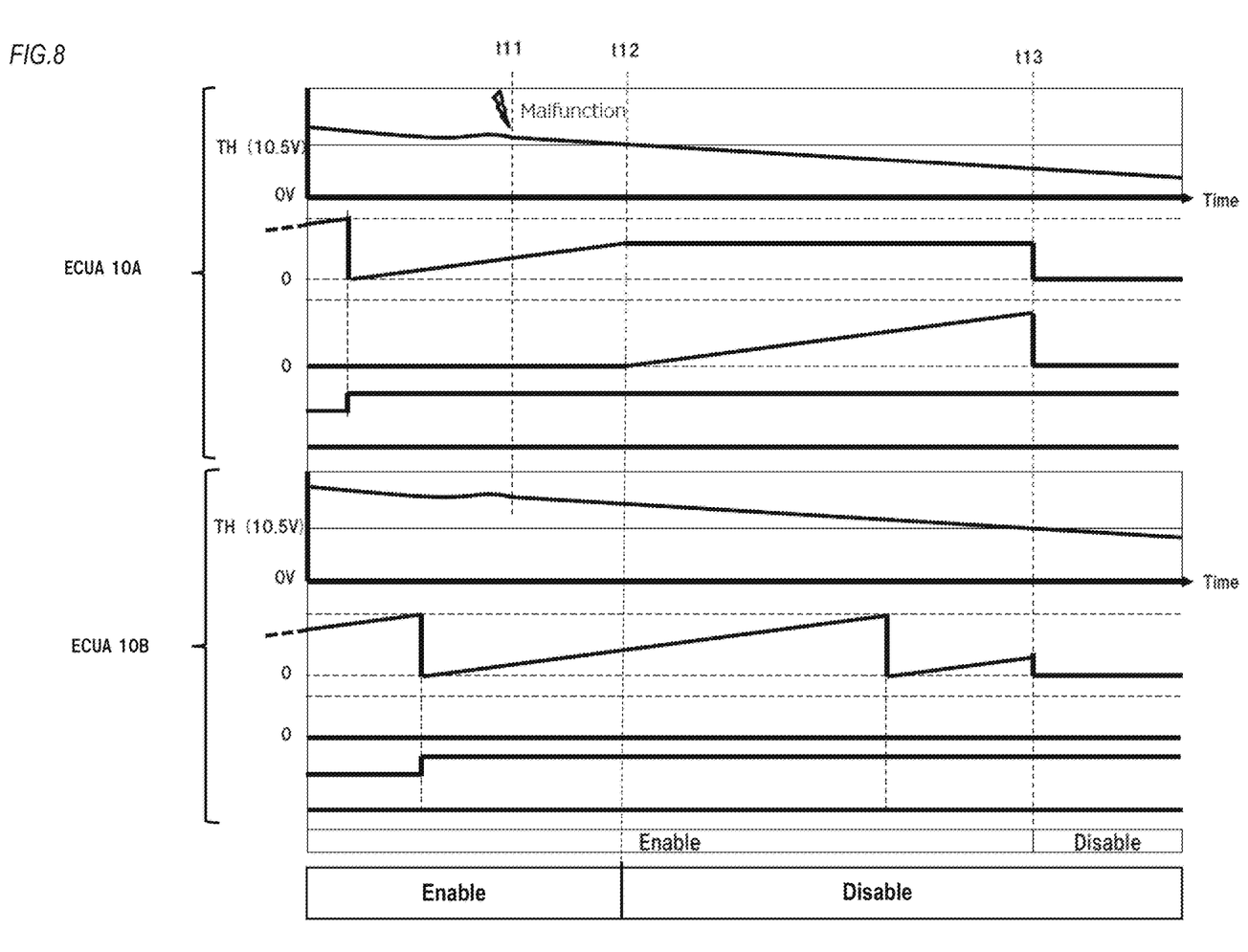
FIG. 8 schematically shows a timing chart of a second embodiment of the present application.

FIG. 8 schematically shows a timing chart of a second embodiment of the present application. In the second embodiment, it may be determined that a possible problem occurs in the power supply system itself which supplies power to ECUs. Such a possible problem includes a malfunction in the low voltage battery, in the vehicle alternator and in the DC/DC converter. Once, a possible problem occurs in the power supply system itself which causes decrease in the power supply voltage, it is difficult to distinguish between the fault occurred in the power supply system inside the ECU and the possible problem occurred in the power supply system itself. Therefore, it may cause false detection or false record of the fault occurred in the power supply system in the ECU itself.

In the second embodiment, the power supply voltages of a plurality of ECUs are monitored. For example, as shown by FIG. 8, the power supply voltage of ECUA 10A and the power supply voltage of ECUB 10B are monitored respectively and concurrently. At the time t11, a possible problem in the DC/DC converter occurs. Due to this possible problem in the power supply system, the power supply voltage starts decreasing.

At the time t12, the power supply voltage drops lower than the threshold voltage TH (first threshold voltage) in the ECUA 10A. At the time t13, the power supply voltage drops lower than the threshold voltage TH (second threshold voltage) in the ECUB 10B. When the power supply voltage drops lower than the threshold voltage TH (second threshold voltage) in the ECUB 10B before the anomaly determination counter reaches the predetermined anomaly threshold time in the ECUA 10A, it is determined that the possible problem occurs in the power supply system on the upstream side of the ECUs, and the anomaly monitoring of the power supply voltage in ECUA is disabled. In this embodiment, the first threshold voltage of the ECUA 10A and the second threshold voltage of the ECUB 10B may be the same value. Alternatively, the first threshold voltage of the ECUA 10A and the second threshold voltage of the ECUB 10B may be different values from each other. For example, the second threshold voltage of the ECUB 10B may be smaller than the first threshold voltage of the ECUA 10A, or vice versa.

At the time t13, the anomaly determination counter is reduced to zero (reset) and the normality determination counter is reduced to zero (reset) in ECUA. On the other hand, at the time t12, when the power supply voltage drops lower than the threshold voltage TH (first threshold voltage) in the ECUA 10A, the anomaly monitoring of the power supply voltage in ECUB is disabled.

Figure 9:
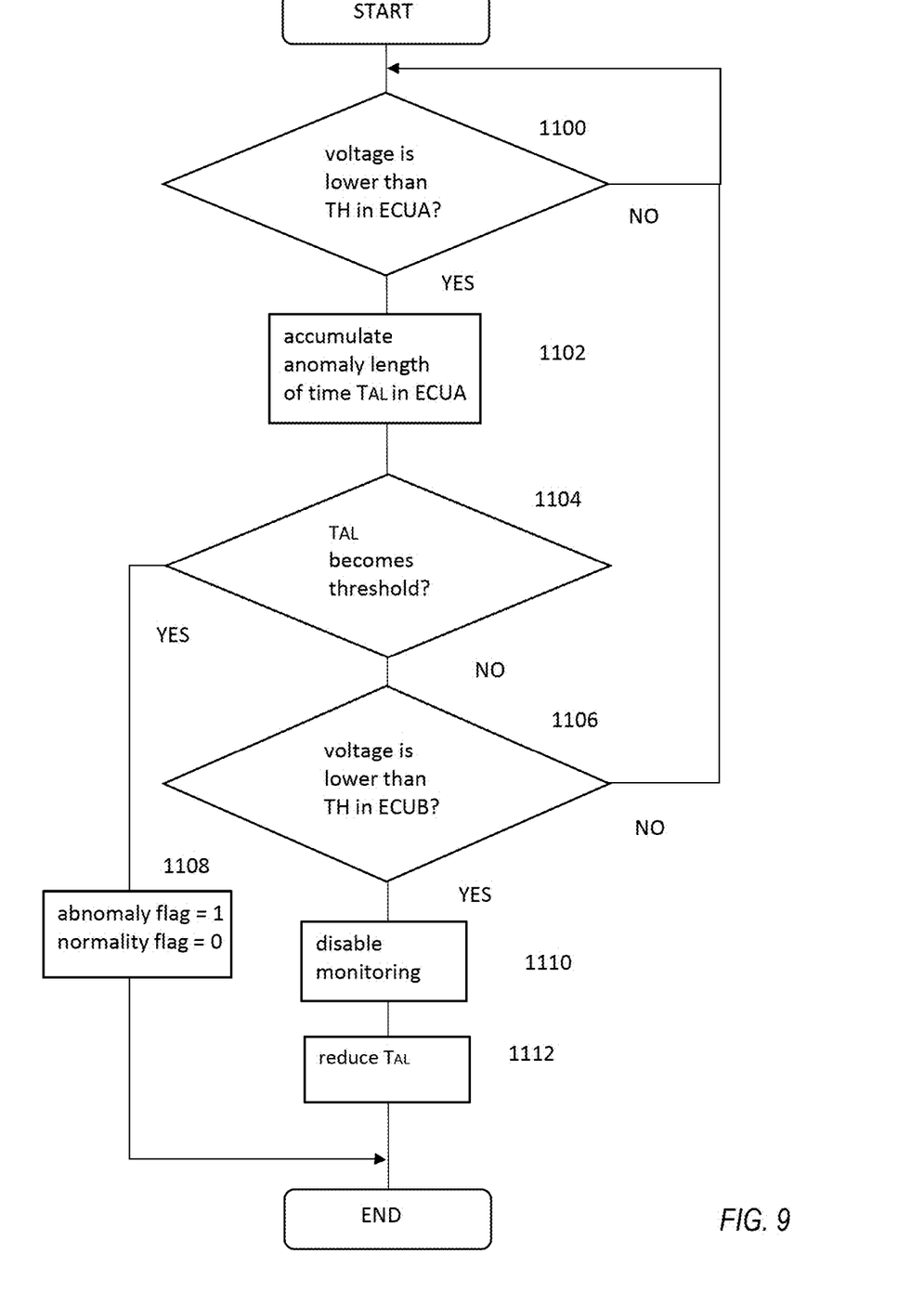
FIG. 9 shows a processing of a power supply voltage monitoring method according to the second embodiment of the present application.

FIG. 9 shows a processing of a power supply voltage monitoring method according to the second embodiment of the present application. The processing described by FIG. 9 is performed by the power supply system health monitoring unit 204.

At step 1100, the power supply system health monitoring unit 204 determines whether the detected power supply voltage is lower than the predetermined first threshold value TH in ECUA. When the answer is negative, the process goes to loop. On the other hand, when the answer is affirmative at step 1100, the process proceeds to step 1102 and the monitoring unit 202 accumulates an anomaly length of time $T_{AL}$. Then, at step 1104, it is determined whether the accumulated anomaly length of time $T_{AL}$ becomes a predetermined anomaly threshold time or more. When the answer is affirmative, the monitoring unit 202 determines that anomaly occurs on the voltage monitoring device and the process proceeds to step 1108. At step 1108, the anomaly flag is set to one and the normality flag is set to zero.

When the answer is negative at step 1104, the process proceeds to step 1106, and the power supply system health monitoring unit 204 determines whether the detected power supply voltage is lower than the predetermined second threshold value TH in ECUB. When the answer is negative, the process goes to loop. On the other hand, when the answer is affirmative at step 1106, the power supply system health monitoring unit 204 determines that the possible problem occurs in the power supply system and disables the anomaly monitoring by the monitoring unit 202 in the ECUA at step 1110. Then, the accumulated anomaly length of time $T_{AL}$ is reduced or reset to zero at step 1112.

In the present embodiment, the power supply system health monitoring unit 204 may monitor power supply voltage drop in a plurality of ECUs and may detect that the power supply voltage drops lower than the threshold voltage TH (second threshold voltage) in the ECUB before the anomaly determination counter reaches the predetermined anomaly threshold time in the ECUA 10A. By this structure, it becomes possible to find that a possible problem occurs in the power supply system itself on the upstream side of the ECUs.

Such a possible problem occurred in the power supply system itself may cause power supply voltage drop regardless of the existence of faults inside the ECUs. In such a situation, the power supply system health monitoring unit 204 may disable the anomaly monitoring by the monitoring unit 202 in the ECUA, or both ECUA and ECUB. Therefore, it is possible to avoid unnecessary false fault detection in the power supply monitoring device.

Moreover, when the possible problem in the power supply system itself is detected, the accumulated anomaly length of time $T_{AL}$ is reduced or reset to zero. Thus, it becomes possible to avoid undesired influence by the anomaly length of time accumulated during the possible problem in the power supply system itself. Thus, it is possible to facilitate more accurate anomaly determination after the possible problem in the power supply system itself is fixed and the anomaly monitoring is restarted.

Figure 10:
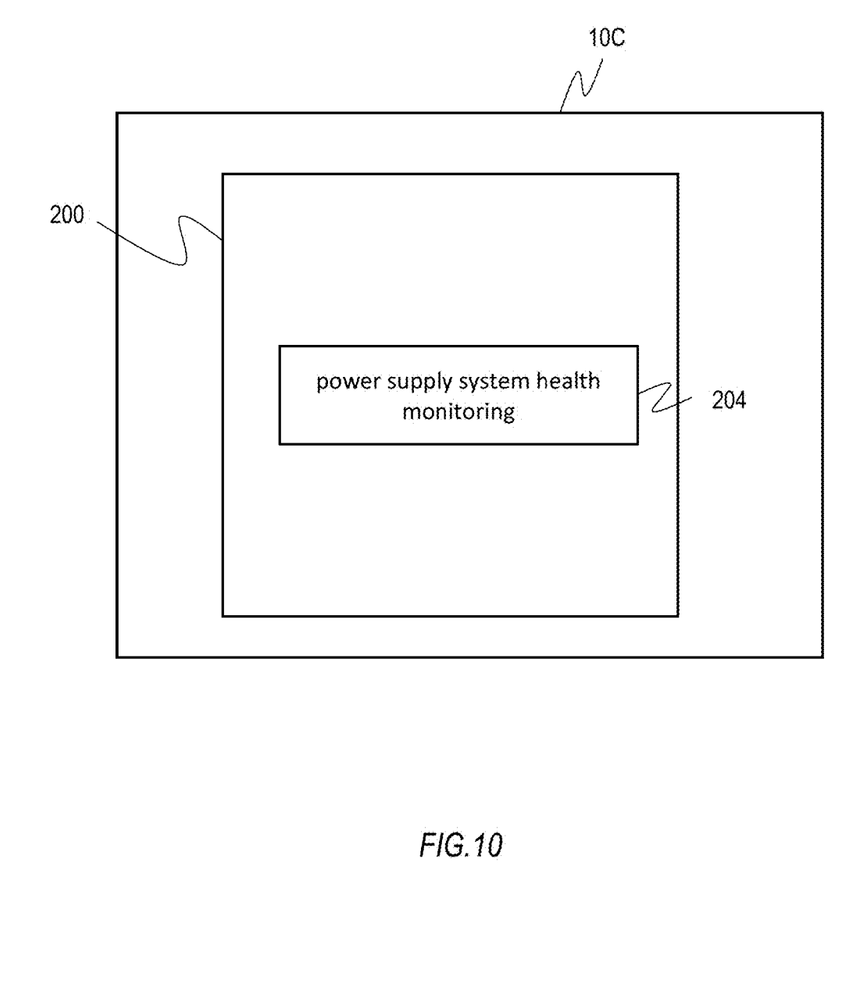
FIG. 10 schematically shows a variation of the second embodiment of the present application.

FIG. 10 schematically shows a variation of the second embodiment of the present application. In the above-described embodiments, the power supply system health monitoring unit 204 is embodied in each of ECUA and ECUB together with the monitoring unit 202. However, the present application is not limited to this configuration. As described by FIG. 10, the power supply system health monitoring unit 204 may be embodied in the other different ECUC 10C. In this variation, the power supply system health monitoring unit 204 monitor the other ECUs such as ECUA and ECUB and sends instruction to the other ECUs.

Third Embodiment

Figure 11:
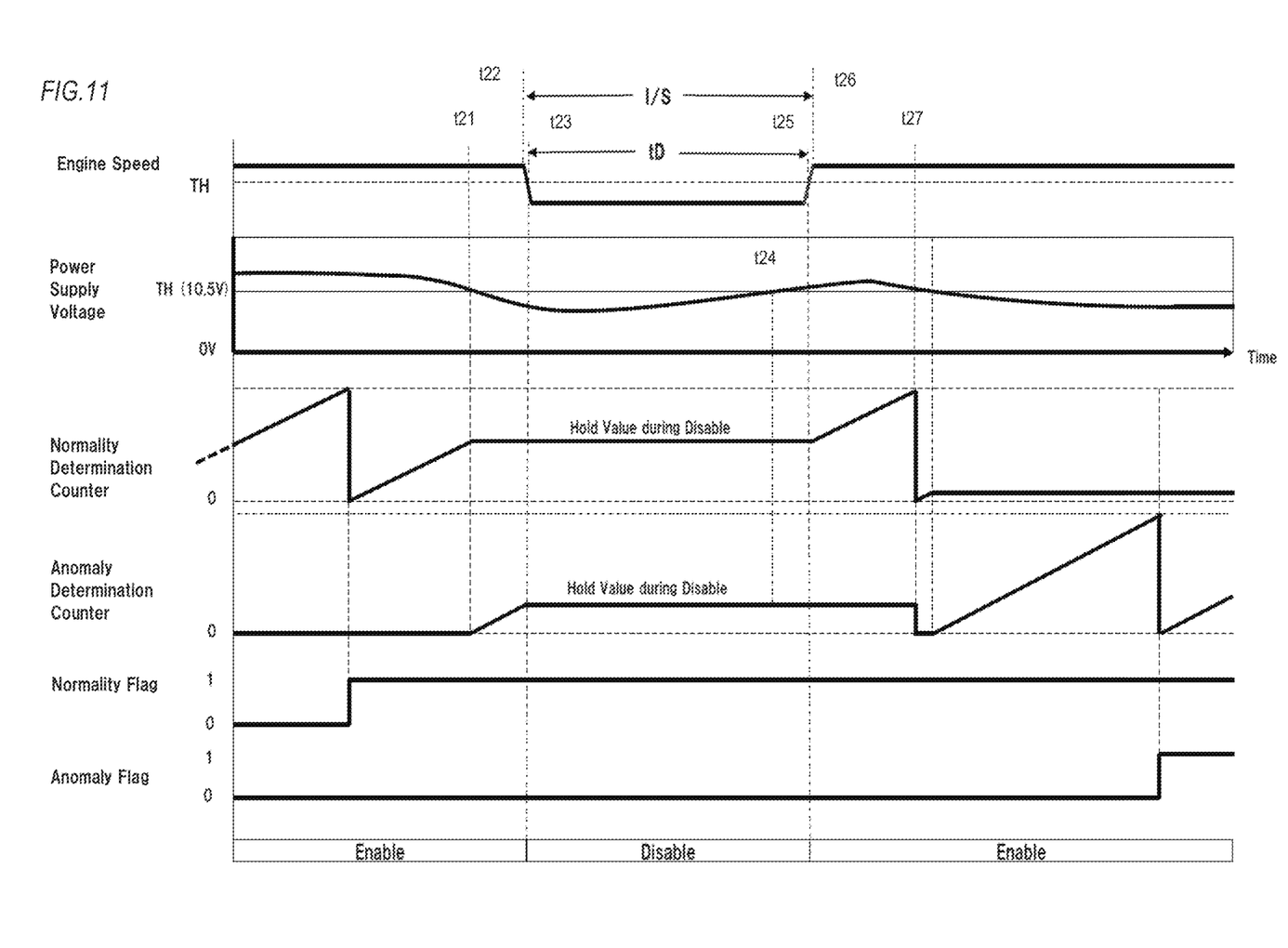
FIG. 11 schematically shows a timing chart of a third embodiment of the present application.

FIG. 11 schematically shows a timing chart of a third embodiment of the present application. In the third embodiment, it may be determined that power generation state in the power supply system satisfies a predetermined state. The predetermined power generation state includes, for example, an idling stop state of an internal combustion engine, a DC-DC converter circuit stop state in the power supply system (EV or HEV), an in-vehicle communication such as CAN activating state after an ignition switch is turned on, or a low engine speed state in which a speed of the internal combustion engine is lower than a predetermined speed.

During the idling stop state of the internal combustion engine, or the DC-DC converter circuit stop state in EV or HEV, the power supply voltage becomes unstable. For example, within three seconds after the ignition switch is turned on, the in-vehicle communication is still under activation and has not been established. When the speed of the internal combustion engine is lower than a predetermined speed, the power supply voltage becomes unstable. The predetermined speed of the internal combustion engine may be decided by experimentation for each model of a vehicle. When the power generation state in the power supply system satisfies these kinds of predetermined state, it may cause false detection or false record of the fault occurred in the power supply system in the ECU itself. FIG. 11 describes as an example a situation of the idling stop state of the internal combustion engine.

At the time t21, the power supply voltage drops lower than the threshold voltage TH. Then, an anomaly determination counter starts accumulating an anomaly length of time during which the detected power supply voltage is lower than the threshold value TH. Also, the normality determination counter stops or pauses the accumulation of the normality length of time.

At the time t22, the internal combustion engine becomes the idling stop state and the speed of the internal combustion engine starts decreasing. Then, at the time t23 the speed of the internal combustion engine falls below a predetermined threshold engine speed. The anomaly monitoring of the power supply voltage in ECU is temporarily disabled. The anomaly determination counter holds the accumulated anomaly length of time. Also, the normality determination counter holds the accumulated normality length of time.

At the time t24, the power supply voltage increases to the value equal to or higher than the threshold voltage TH. However, the anomaly monitoring of the power supply voltage in ECU is still temporarily disabled. At the time t25, due to restarting of the internal combustion engine, the speed of the internal combustion engine increases to the value equal to or higher than the predetermined threshold engine speed. The anomaly monitoring of the power supply voltage in ECU is enabled and restarted.

At the time t26, the idling stop state fully ends. At the time t27, the normality determination counter has reached the predetermined normality threshold time. A normality flag is set to 1. Also, the normality determination counter has been reduced to zero (reset).

Figure 12:
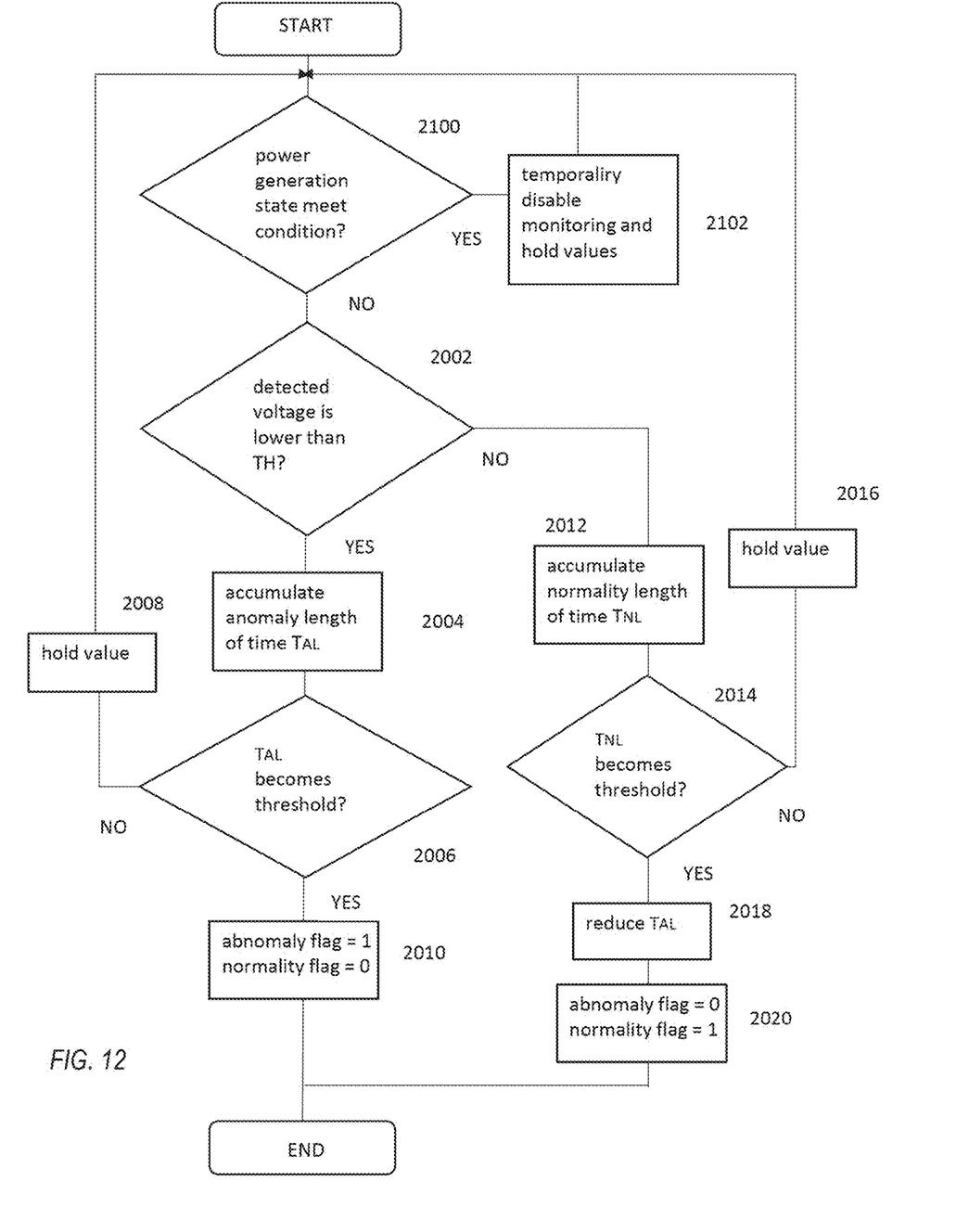
FIG. 12 shows a processing of a power supply voltage monitoring method according to the third embodiment of the present application.

FIG. 12 shows a processing of a power supply voltage monitoring method according to the third embodiment of the present application. Compared with FIG. 7, like elements are described by using like reference numerals and repetitive description of like elements employed in one or more embodiments described herein is omitted.

At step 2100, the power generation state determining unit 206 determines whether the power generation state in a power supply system satisfies the predetermined state including, for example, an idling stop state of an internal combustion engine, a DC-DC converter circuit stop state in the power supply system (EV or HEV), a Control Area Network (CAN) communication activating state after an ignition switch is turned on, or a low engine speed state in which a speed of the internal combustion engine is lower than a predetermined speed.

When the answer is affirmative at step 2100, the power generation state determining unit 206 temporarily disables the anomaly monitoring by the monitoring unit 202 at step 2102. Also, at step 2102, the power generation state determining unit 206 holds the value in the anomaly determination counter and the normality determination counter. On the other hand, the answer is negative as step 2100, the process proceeds to step 2002 and the anomaly monitoring by the monitoring unit 202 is performed as described by the first embodiment.

When the power generation state in a power supply system satisfies the predetermined state, the power supply voltage becomes unstable or detection of the power supply voltage becomes unstable. Thus, it is impossible to accurately detect faults in the power supply voltage monitoring device based on the detected voltage. In the present embodiment, in such a situation, the anomaly monitoring may be temporarily disabled. Therefore, it is possible to avoid unnecessary false fault detection in the power supply monitoring device.

Moreover, when the power generation state in a power supply system satisfies the predetermined state, the power generation state determining unit 206 holds the value in the anomaly determination counter and the normality determination counter. Thus, when the power generation state in the power supply system no longer satisfies the predetermined state and the power generation state determining unit 206 enables and restarts the anomaly monitoring, it is possible to restart the accumulation of the anomaly length of time $T_{AL}$ and the normality length of time $T_{NL}$. Therefore, it is possible to improve accurate determination of anomaly or fault occurrence in the power supply voltage monitoring device for the ECU.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications. In the accompanying claims, a processor is not limited to a single processor, a processor may be implemented by one or more processor. Also, multiple processes or functions may be implemented by a single processor.

The operations, procedures, steps, stages and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A voltage monitoring device monitoring a power supply voltage to an electronic control unit equipped with a vehicle comprising:
   a detector detecting the power supply voltage to the electronic control unit; and
   a monitoring processor performing an anomaly monitoring on the power supply voltage to the electronic control unit, the anomaly monitoring determining whether anomaly occurs on the voltage monitoring device,
   wherein, as the anomaly monitoring, the monitoring processor:
   compares the detected power supply voltage with a predetermined threshold value,
   accumulates an anomaly length of time during which the detected power supply voltage is lower than the predetermined threshold value,
   determines whether the accumulated anomaly length of time becomes a predetermined anomaly threshold time or more, and
   when it is determined that the accumulated anomaly length of time becomes the predetermined anomaly threshold time or more, determines that the anomaly occurs on the voltage monitoring device.

2. The voltage monitoring device according to claim 1, wherein the monitoring processor:
   accumulates a normality length of time during which the detected power supply voltage is equal to or more than the predetermined threshold value,
   determines whether the accumulated normality length of time becomes a predetermined normality threshold time or more, and
   when it is determined that the accumulated normality length of time becomes the predetermined normality threshold time or more, reduces the accumulated anomaly length of time.

3. The voltage monitoring device according to claim 1, wherein the electronic control unit includes a plurality of electronic control units, and the voltage monitoring device further comprises a power supply system health monitoring processor determining whether a possible problem occurs in a power supply system,
   wherein when it is determined that the possible problem occurs in the power supply system, the power supply system health monitoring processor disables the anomaly monitoring by the monitoring processor,
   wherein the power supply system health monitoring processor determines that the possible problem occurs in the power supply system when:
   the detected power supply voltage to a first electronic control unit falls below a predetermined first threshold voltage, and
   the detected power supply voltage to a second electronic control unit falls below a predetermined second threshold voltage before the accumulated anomaly length of time becomes the predetermined anomaly threshold time or more in the first electronic control unit.

4. The voltage monitoring device according to claim 3, wherein
   when it is determined that the possible problem occurs in the power supply system, the power supply system health monitoring processor reduces the accumulated anomaly length of time.

5. The voltage monitoring device according to claim 1, further comprises a power generation state determining processor determining whether a power generation state in a power supply system satisfies a predetermined state,
   wherein when it is determined that the power generation state in the power supply system satisfies the predetermined state, the power generation state determining processor temporarily disables the anomaly monitoring by the monitoring processor.

6. The voltage monitoring device according to claim 5, wherein when it is determined that the power generation state in the power supply system no longer satisfies the predetermined state, the power generation state determining processor enables the anomaly monitoring by the monitoring processor, and
   the accumulated anomaly length of time is maintained during time when the anomaly monitoring by the monitoring processor is temporarily disabled.

7. The voltage monitoring device according to claim 1, wherein the predetermined anomaly threshold value is varied according to a power generation state in a power supply system.

8. The voltage monitoring device according to claim 2, wherein the monitoring processor, when it is determined that the accumulated normality length of time becomes the predetermined normality threshold time or more, resets the accumulated anomaly length of time to zero.

9. The voltage monitoring device according to claim 5, wherein the predetermined state includes at least either one of:
   an idling stop state of an internal combustion engine,
   a DC-DC converter circuit stop state in the power supply system (EV or HEV),
   an in-vehicle communication activating state after an ignition switch is turned on, or
   a low engine speed state in which a speed of the internal combustion engine is lower than a predetermined speed.

10. The voltage monitoring device according to claim 3, wherein the possible problem which occurs in the power supply system is a problem occurring in the power supply system located on the upstream side of the electronic control units.

11. The method according to claim 5, further comprising:
    when it is determined that the power generation state in the power supply system no longer satisfies the predetermined state, enabling the anomaly monitoring, and
    wherein the accumulated anomaly length of time is maintained during time when the anomaly monitoring by the monitoring processor is temporarily disabled.

12. A method of monitoring a power supply voltage to an electronic control unit equipped with a vehicle by using a voltage monitoring device, comprising:
    performing an anomaly monitoring comprising:
    detecting the power supply voltage to the electronic control unit;
    comparing the detected power supply voltage with a predetermined threshold value;
    accumulating an anomaly length of time during which the detected power supply voltage is lower than the predetermined threshold value;
    determining whether the accumulated anomaly length of time becomes a predetermined anomaly threshold time or more; and
    when it is determined that the accumulated anomaly length of time becomes the predetermined anomaly threshold time or more, determining that the anomaly occurs on the voltage monitoring device.

13. The method according to claim 12, further comprising:
accumulating a normality length of time during which the detected power supply voltage is equal to or more than the predetermined threshold value,
determining whether the accumulated normality length of time becomes a predetermined normality threshold time or more, and
when it is determined that the accumulated normality length of time becomes the predetermined normality threshold time or more, reducing the accumulated anomaly length of time.

14. The method according to claim 12, wherein the electronic control unit includes a plurality of electronic control units,
wherein the method further comprises:
determining that possible problem occurs in the power supply system when:
the detected power supply voltage to a first electronic control unit falls below a predetermined first threshold voltage, and
the detected power supply voltage to a second electronic control unit falls below a predetermined second threshold voltage before the accumulated anomaly length of time becomes the predetermined anomaly threshold time or more in the first electronic control unit, and
when it is determined that the possible problem occurs in the power supply system, disabling the anomaly monitoring.

15. The method according to claim 14, further comprising:
when it is determined that the possible problem occurs in the power supply system, reducing the accumulated anomaly length of time.

16. The method according to claim 12, further comprising: determining whether a power generation state in a power supply system satisfies a predetermined state, and
when it is determined that the power generation state in the power supply system satisfies the predetermined state, temporarily disabling the anomaly monitoring.

17. The method according to claim 12, wherein the predetermined anomaly threshold value is varied according to a power generation state in a power supply system.

18. The method according to claim 13, wherein when it is determined that the accumulated normality length of time becomes the predetermined normality threshold time or more, resetting the accumulated anomaly length of time to zero.

19. The method according to claim 16, wherein the predetermined state includes at least either one of:
an idling stop state of an internal combustion engine,
a DC-DC converter circuit stop state in the power supply system (EV or HEV),
an in-vehicle communication activating state after an ignition switch is turned on, or
a low engine speed state in which a speed of the internal combustion engine is lower than a predetermined speed.

20. A power supply system comprising a power supply and a voltage monitoring device monitoring a power supply voltage from the power supply to an electronic control unit equipped with a vehicle, the voltage monitoring device comprising:
a detector detecting the power supply voltage to the electronic control unit; and
a monitoring processor performing an anomaly monitoring on the power supply voltage to the electronic control unit, the anomaly monitoring determining whether anomaly occurs on the voltage monitoring device,
wherein, as the anomaly monitoring, the monitoring processor:
compares the detected power supply voltage with a predetermined threshold value,
accumulates an anomaly length of time during which the detected power supply voltage is lower than the predetermined threshold value,
determines whether the accumulated anomaly length of time becomes a predetermined anomaly threshold time or more, and
when it is determined that the accumulated anomaly length of time becomes the predetermined anomaly threshold time or more, determines that the anomaly occurs on the voltage monitoring device.

* * * * *